Nov. 28, 1944.     A. BLOCH ET AL     2,363,636
VEHICLE
Filed Feb. 10, 1942     2 Sheets-Sheet 1

INVENTORS.
Arthur Bloch and
BY George R. Arons
Frederick E. Hahn

Nov. 28, 1944.　　A. BLOCH ET AL　　2,363,636
VEHICLE
Filed Feb. 10, 1942　　2 Sheets-Sheet 2
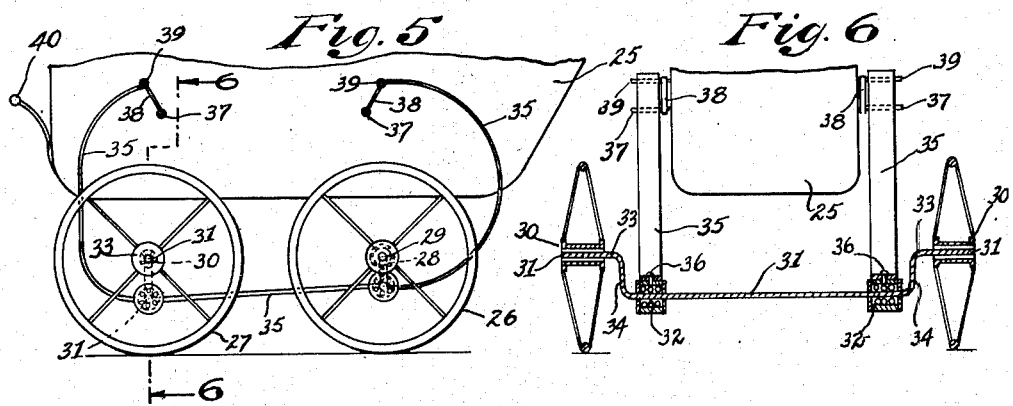
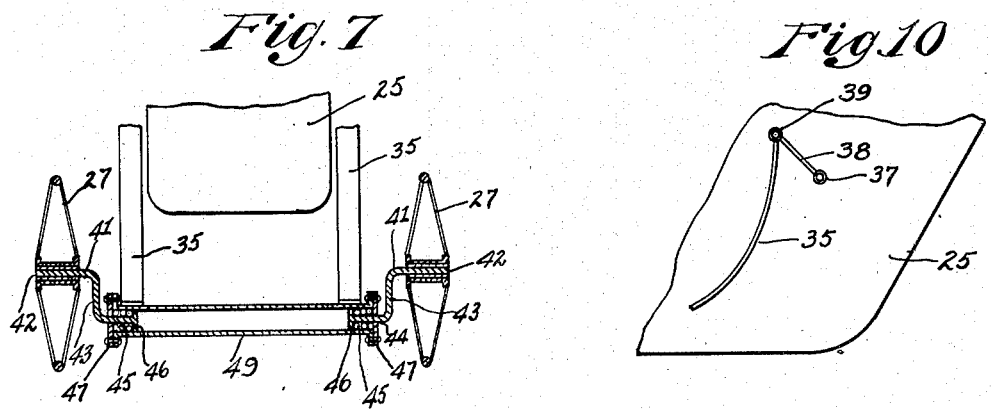
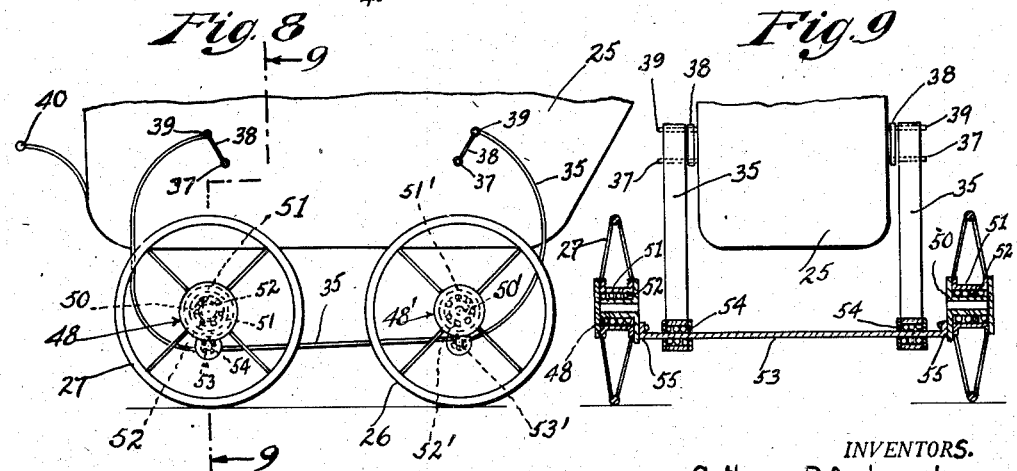
INVENTORS.
Arthur Bloch and
BY George R. Arons Patented Nov. 28, 1944

2,363,636

UNITED STATES PATENT OFFICE 2,363,636

VEHICLE

Arthur Bloch, Jamaica, and George R. Arons, New York, N. Y.

Application February 10, 1942, Serial No. 430,186

5 Claims. (Cl. 280—29)

The invention relates to improvements in vehicles having at least two wheel axles, particularly to improvements in baby carriages, invalids' roll chairs, invalids' carriages, bicycles, tricycles and so like and more particularly to improvements in the chassis of such vehicles.

One object of the invention is to provide means adapted to facilitate the lifting of vehicles to a higher level or over obstructions.

Another object of the invention is to provide means adapted to facilitate the lowering of vehicles of the class described to a lower level.

Another object of the invention resides in a baby carriage, an invalid's roll chair or a similar vehicle of the class described and is to provide means by which the pushing movement conventionally used for moving such vehicles is transformed into and made effective substantially as a pulling and lifting force. We have found that such transformation reduces the effort to be applied in overcoming obstructions and in lifting a vehicle to a higher level very substantially.

Another object of the invention is to provide shock absorbing means for vehicles of the class described.

Other and further objects and advantages of the invention will become apparent from the scope of the invention indicated by the appended claims.

In the accompanying drawings several embodiments of the invention are shown.

Fig. 5 shows a side view of a baby carriage according to the invention.

Fig. 6 shows a section along line 6—6 of a chassis of a baby carriage according to Fig. 5.

Fig. 7 shows a section of another embodiment of a chassis of a baby carriage according to the invention.

Fig. 8 shows a side view of another embodiment of a baby carriage having a chassis according to the invention.

Fig. 9 shows a section along line 9—9 of a chassis of a baby carriage according to Fig. 8, and Fig. 10 shows a different embodiment of a detail of a baby carriage according to the invention.

Figure 1:
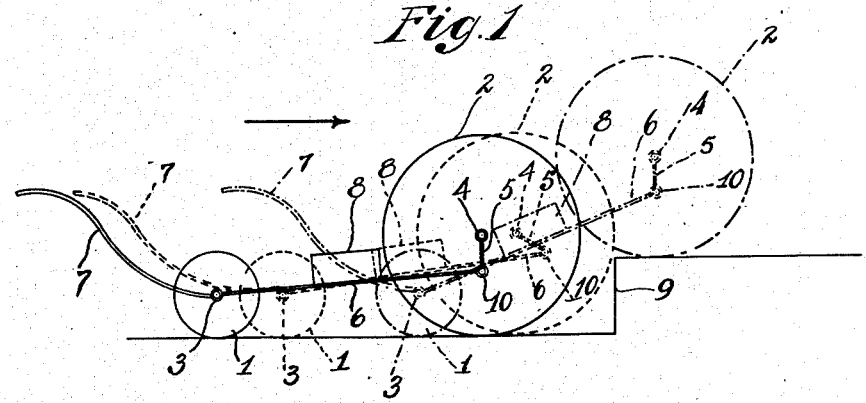
Fig. 1 is a diagrammatic view of a chassis of a vehicle according to the invention in different positions.

Fig. 1 shows diagrammatically the chassis of a manually operated vehicle having two small rear wheels 1 and two larger front wheels 2. The rear wheels are rotatably mounted on an axle 3 and the front wheels on an axle 4. One or more guiding arms 5 are pivotally connected with front axle 4. One or two connecting rods 6 are pivotally connected with rear axle 3 and the free end of guiding arm or arms 5. A handle 7 is rigidly secured to connecting rod or rods 6. The length of guiding arms 5 and the diameter of rear wheels 3 are such that the position of connecting rods 6 is upwardly inclined from the rear axle toward the front axle as shown in the drawing. The weight of the vehicle body and any load placed on the vehicle is indicated by a rectangle 8 resting on connecting rod or rods 6. The forward direction of the vehicle is indicated by an arrow.

It is assumed that the vehicle is moved over a horizontal plane and shall be lifted upon curb 9. When the vehicle is freely moving over a horizontal plane connecting rod 6 and guiding arm 5 are in positions shown by full lines. As soon as front wheel 2 strikes the edge of the curb, the free movement of the front wheels is arrested. Since the pushing force exerted on handle 7 in order to move the vehicle forward is effective at least partly in the direction of the axis of connecting rod 6, the connecting rod and guiding arm 5 will be gradually moved into the position shown in Fig. 1 by dotted lines. In this position the pivot point 10 between guiding arm 5 and connecting rod 6 is ahead of axle 4 and raised to about the same level or somewhat higher than the plane of curb 9. As soon as the front wheels have reached the curb, the various parts of the chassis will return to their original positions, which is indicated by dash-dotted lines. We have found that due to the upward inclination of the connecting rod and its pivotal connection between the front and rear of the chassis, greatly facilitates the overcoming of any obstructions in the path of the chassis. The lifting of a chassis over and upon an obstruction will be the easier, the higher the percentage of the force which is converted from a pushing force into a pulling and lifting force. This ratio can be improved by increasing the upward inclination of connecting rod 6, for example by reducing the distance between the front and rear axles. We have obtained particularly good results when front and rear wheels overlap each other partly. Other means are to reduce the radius of the rear wheels relative to the front wheels or to shorten the length of guiding arms 5. A further improvement can be obtained by arranging handle 7 in such a manner that a large component of the force exerted upon this handle is effective in the direction of the axis of connecting rod or rods 6. The theoretically ideal arrangement of handle 7 is of course to dispose handle 7 in alignment with connecting rod 6. However, in practice a compromise as to the disposition of handle 7 will be necessary to permit a convenient pushing of the vehicle.

Figure 2:
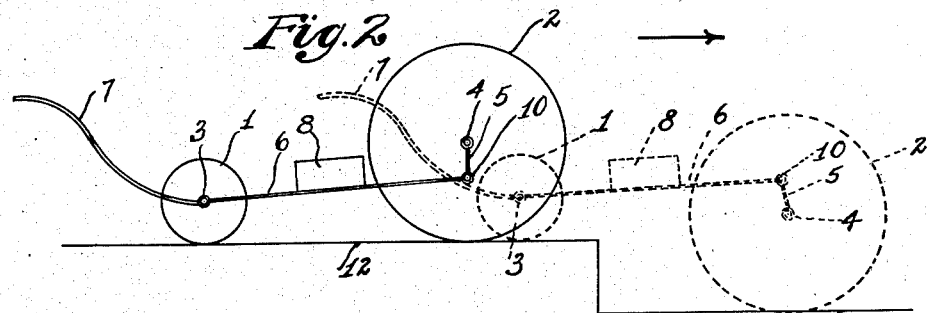
Fig. 2 shows a chassis according to Fig. 1 in other positions.

Fig. 2 shows the lowering of the chassis from a higher plane 12 to a lower plane 11. As long as the vehicle is moving freely on the higher plane, the various elements of the chassis will be in the positions indicated by full lines, in particular guiding arms 5 will be in a substantially vertical position. As soon as front wheels 2 begin to leave higher plane 12 they will fall downward due to the pivotal connection between connecting rod 6 and guiding arm 5. Pivot point 10 between these two elements 6 and 5 and guiding arm or arms 5 will assume the positions indicated in Fig. 2 by dotted lines.

The arrangement shown in Figs. 1 and 2 can be used for chassis having two wheels, three wheels, four wheels or more. It is essential only that two wheel bases are provided and that wheels and axles are suspended and connected as described.

Figure 3:
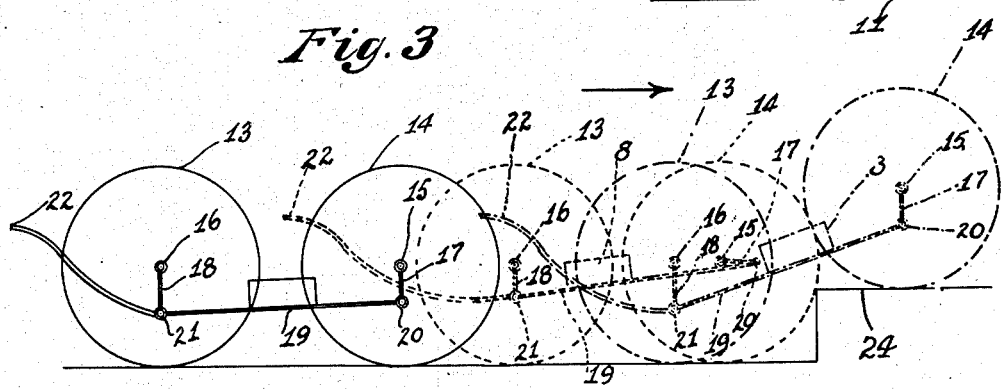
Fig. 3 is a diagrammatic view of a second embodiment of a chassis according to the invention; the chassis is shown in different positions.
Figure 4:
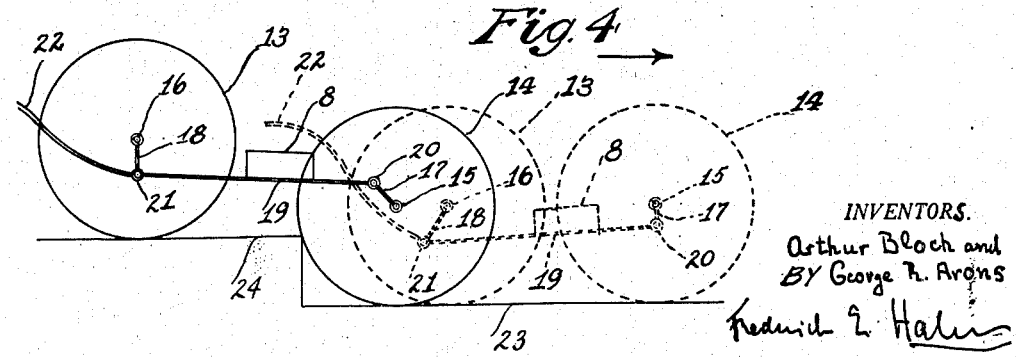
Fig. 4 shows other positions of a chassis according to Fig. 3.

The chassis diagrammatically shown in Figs. 3 and 4 comprises front wheels 13 and rear wheels 14 having equal or substantially equal diameters. The front wheels are mounted on an axle 15 and the rear wheels on an axle 16. The chassis shown in Figs. 3 and 4 is particularly suitable for vehicles having four wheels. However, it is also usable for chassis having two, three or more than four wheels.

At least one guiding arm 17 is pivotally connected with axle 15. At least one second guiding arm 18 is pivotally connected with axle 16, guiding arm or arms 18 being longer than guiding arm or arms 17. At least one connecting rod 19 connects the two guiding arms and is pivotally secured to these arms at pivot points 20 and 21. Due to the unequal length of guiding arms 17 and 18, connecting rod 19 is disposed in a position upwardly inclined from its rear axle connection toward its front axle connection. The load resting upon the chassis is indicated by rectangle 8. A handle 22 is rigidly connected with connecting arm 19. The handle is arranged in such an angular position that any pushing force exerted upon this handle is at least partly effective in the direction of the axis of connecting rod 19.

As long as front and rear wheels are resting on a horizontal plane 23, the various parts of the chassis are in positions indicated by full lines. It is now assumed the chassis shall be lifted on a curb 24. As soon as front wheels 13 strike against the edge of the curb and the pushing force exerted upon handle 22 is continued, the various pivotal parts of the chassis including connecting rod 19 move into the positions indicated by dotted lines. Due to the upwardly inclined position of connecting rod 19 a strong lifting force is exerted upon the front wheels and these will easily glide on curb 24. As soon as the front wheels are resting on the curb the various parts assume positions indicated in Fig. 3 by dash-dotted lines.

Fig. 4 illustrates the actions of various pivotal elements of the chassis when it is lowered from higher plane 24 to lower plane 23. As soon as front wheels 13 pass over the edge of the higher plane the wheels fall down due to the weight and the pivotal connection between axle 15, guiding arm 17 and guiding rod 19. The various parts of the chassis resume positions indicated by full lines in Fig. 4. In this position guiding arm 17 and connecting rod 19 form an obtuse angle. As soon as wheels 14 pass over the edge of the upper level 24 they also descend. Guiding arm 18 and connecting rod 19 will resume positions shown in Fig. 4 by dotted lines after the downward movement of the rear wheels. As soon as the movement of the chassis is continued on the lower level, the various parts will again resume the position shown in Fig. 3 by full lines.

Fig. 5 illustrates the application of the invention to a baby carriage. The baby carriage comprises a body 25 of ordinary design, two front wheels 26 and two rear wheels 27. The front wheels are rotatably mounted by means of suitable bearings, for instance roller bearings 28 on an axle 29. The rear wheels are rotatably mounted by means of bearings 30 on an axle 31. Axle 31 is rotatably mounted in bearings of conventional design, for instance roller bearings 32. Both ends of axle 31 are bent off twice to form journals 33 for wheel bearings 30. Front axle 29 is shaped and mounted in the same manner as rear axle 31 except that the bent off sections 24 of rear axle 31 are longer than the corresponding bent off sections of front axle 29. It is obvious from the description of Figs. 3 and 4 that the journals correspond to pivot points 15 and 16 of Fig. 3, bent off sections correspond to the guiding arms of Fig. 3 and the rotatable mounting of the axles in bearings 32 correspond to pivots 20 and 21 of Fig. 3. Rear axle 31 and front axle 29 are connected by carriage springs 35. These springs which may be of conventional design are rigidly connected to bearings 32 of front and rear axles by any suitable means, for instance bolts or rivets 36. It is obvious that the approximately straight spring sections connecting front and rear axles correspond to the connecting rod or rods of Figs. 3 and 4.

The carriage body 25 is suspended in a conventional manner by means of bolts 37 secured to the carriage body. These bolts 37 are secured to the springs by intermediate leather or metal strips 38 which in turn are pivotally affixed to springs 35 at pivot points 39. In order to push the car a handle 40 is provided. However, it is also possible to connect the handle rigidly with springs 35 or axle 31. Handle 40 or any other handle is arranged in such a manner that at least part of the pushing force exerted upon the handle is transmitted to the spring in the direction of the axis of the spring section connecting rear and front axles. It is apparent that the percentage of the force exerted upon handle 40 which will be effective in the direction of the spring axis will be the higher the more the handle is arranged in alignment with the axis of the spring section connecting rear and front axles. However, in practice a certain compromise will have to be made in order to permit a convenient pushing of the carriage.

The operation of the guiding system of the chassis is easily understandable from the previously described figures. As long as the baby carriage moves over the even ground the various parts remain in the position shown in Fig. 5. As soon as the front wheels strike against an obstruction, front axle 31 and with it the spring sections pivotally connected to it will be thrown forward and assume a position indicated in Fig. 3 by dotted lines. Due to the upwardly inclined position of the spring sections connecting the axles, bearings 32 corresponding to pivot point 20 in Fig. 3 are moved ahead of the rotation centers of the front wheels and raised to or above the level of the obstruction. Consequently, the front wheels will easily glide on and over the obstruction. When the carriage is to be lowered from a higher level to a lower level, the front wheels will automatically descend to the lower level due to the swinging suspension of the wheel axles as has been described in connection with Fig. 4. The rear wheels will also descend as soon as they leave the higher level. The carriage springs due to their inherent elasticity and their elastic suspension will easily yield to the pushing and pulling forces exerted upon the axles, thus permitting a free swinging and pivoting of the axles.

The modification shown in Fig. 7 is similar to the embodiment shown in Figs. 5 and 6. Instead of axles consisting of one piece, axles are provided comprising a central tube section 49 which is rigidly secured to springs 35 by any suitable means. Central section 49 serves to mount two journal sections 41. Each journal section comprises a wheel journal 42, a bent off section 43 and a second journal 44 which is rotatably disposed in tube section 49 by means of a suitable bearing, for instance a roller bearing 45 and secured in tube section 49 by a flange 46 and a cover 47. This arrangement has the advantage that each wheel is individually suspended, hence absorbing obstructions independently. Fig. 7 shows the rear axle. The front axle may be designed in the same manner as the rear axle or as shown in Fig. 6. In both cases the bent off sections of the front axle have to be shorter than the bent off sections 43 of the rear axle in order to secure the intended upward inclination of the connecting spring sections.

The operation of the guiding system is apparent from the previous description so that no detailed description is deemed necessary.

Figs. 8 and 9 show another modification of the principle of the invention. Front wheels 26 and rear wheels 27 are suspended by means of bearings, for instance ball bearings or roller bearings 48 and 48'. Each bearing consists of an inner ring 50 and 50' respectively. The outer ring 51 and 51' is rotatable on the inner ring by means of balls or rollers 52 and 52' respectively. The wheels are secured to the outer rings so that they can rotate freely around the inner rings, the centers of the rings being also the rotation centers of the wheels. The carriage axles 53 and 53' respectively are secured by any suitable means to inner rings 50 and 50' at points 55 as shown in Fig. 9. The axles are arranged in such a position that the front axle 53' is higher than the rear axle relative to a horizontal plane. This can be accomplished by using inner rings 50 having a greater diameter than inner rings 50' as shown in Fig. 8 or by securing the rear axle to extensions provided on inner rings 50. Springs 35 are pivotally secured to axles 53 and 53' by means of suitable bearings 54 and 54', the spring sections connecting the two axles being upwardly inclined.

It is apparent from the previous description and the drawings that the modification according to Figs. 8 and 9 corresponds in principle to the chassis diagrammatically shown in Fig. 3. Point 16 of Fig. 3 corresponds to the rotation center of rear wheels 27, guiding arm 18 corresponds to the radial distance between the rotation centers of wheels 27 and the connection points between axle 53 and inner rings 50. Pivot point 21 corresponds to the pivotal mounting of axle 53 in bearings 54. The upwardly inclined spring sections between the axles correspond to connecting rod 19. The suspension of the front wheels is similar to that of the rear wheels so that no detailed description is deemed necessary.

As long as the carriage is on even ground the various parts will be in the position shown in Fig. 8. But, as soon as the front wheels, or only one of them, strike against a curb, front axle 53' and spring sections 35 pivotally connected to it will move forward due to a rotation of rings 50' about their rotation centers. Consequently, the connecting points between axle 53' and inner rings 50' will be raised and moved ahead of the rotation centers of the front wheels.

When the carriage is to be moved from a higher level to a lower level the front wheels will descend to the lower level as soon as they leave the upper level due to the mobility of the inner rings 50' relative to the outer rings 51'. The inner rings will simply swing about their rotation centers. The rear wheels will follow in a similar manner.

Fig. 10 shows a modification of the suspension of body 25. In the embodiments previously shown the swingable intermediate sections 38 are disposed toward the center of the carriage body. We have found that under certain circumstances it is more advisable to arrange intermediate sections 38 as shown in Fig. 10. According to this arrangement intermediate sections extend from spring connection points 39 toward the edges of the carriage body. Sections 38 may be disposed inclined or horizontally. In other words, the position of the intermediate strips 38 is reversed relative to the springs. Due to the spring suspension shown in Fig. 10, the upward inclination of the central spring sections becomes steeper when the frontal guiding arms are moved forward. We have found that this arrangement increases the ratio of the pushing force which is converted into a pulling and lifting force when the front wheels of the carriage strike against an obstruction.

Our invention is not limited to the embodiments shown, but various changes and alterations may be made without departing from the scope of the invention.

What we claim as new and desire to secure by Letters Patent is as follows:

1. A vehicle of the class described comprising a rear journal, at least one wheel rotatably mounted on said rear journal, a front journal, at least one wheel rotatably mounted on said front journal, at least one guiding arm connected with said front journal, at least one guiding arm connected with said rear journal, said first guiding arm being shorter than said second guiding arm, at least one connecting rod connecting said two guiding arms, said connecting rod being pivotally secured to said guiding arms and disposed in a position upwardly inclined from its rear connection toward its front connection and means for applying a pushing force in the direction of the axis of said connecting rod.

2. A vehicle of the class described comprising a rear axle, two wheels rotatably mounted on said rear axle, part of said axle being bent to form journals having axis parallel to the axis of said rear axle for said wheels, a front axle, two wheels rotatably mounted on said front axle, part of said front axle being bent to form journals having axis parallel to said front axle for said wheels, said front axle being arranged higher than said rear axle relative to a horizontal plane, at least one connecting rod connecting said two axles, said rod being pivotally secured to said axles and disposed in a position upwardly inclined from its rear axle connection toward its front axle connection and means for applying a pushing force in the direction of the axis of said connecting rod.

3. A vehicle of the class described comprising a rear axle, two wheels rotatably mounted on said rear axle, part of said rear axle being bent to form journals having axis parallel to the axis of said rear axle for said wheels, a front axle, two wheels rotatably mounted on said front axle, part of said front axle being bent to form journals having axis parallel to the axis of said front axle for said front wheels, a carriage body, springs for supporting said body, at least one of said springs being pivotally connected with said front axle and said rear axle, the spring section connecting said two axles being disposed in a position upwardly inclined from its rear connection toward its front connection and a handle arranged to transmit a pushing force exerted upon said handle at least partly in the direction of the axis of the spring section connecting said two axles.

4. A vehicle of the class described comprising two rear journals, two rear wheels rotatably mounted on the rear journals, two front journals, two front wheels rotatably mounted on the front journals, rear guiding arms connected with each of the rear journals, front guiding arms connected with each of the front journals, the front guiding arms being shorter than the rear guiding arms, a carriage body, springs for supporting said body, at least one of the springs pivotally connecting the rear guiding arms with the front guiding arms, the spring section connecting the rear guiding arms with the front guiding arms being disposed and arranged in a position upwardly inclined from its rear connection toward its front connection, and means for applying a pushing force substantially in the direction of the longitudinal axis of the connecting spring section.

5. A vehicle as described in claim 4 in combination with a handle arranged to transmit a pushing force upon said handle at least partly in the direction of the axis of said spring section connecting the rear guiding arms with the front guiding arms.

ARTHUR BLOCH.
GEORGE R. ARONS.